US008584408B1

(12) United States Patent
Tafuto et al.

(10) Patent No.: US 8,584,408 B1
(45) Date of Patent: Nov. 19, 2013

(54) PANEL MOUNTING SYSTEM FOR BERMS, SOLAR ENERGY FARM USING THE SYSTEM, AND METHOD OF INSTALLING THE SYSTEM

(75) Inventors: William S. Tafuto, Hummelstown, PA (US); Bryan M. Wehler, Danville, PA (US)

(73) Assignee: ARM Group, Inc., Hershey, PA (US)

( * ) Notice: Subject to any disclaimer, the term of this patent is extended or adjusted under 35 U.S.C. 154(b) by 275 days.

(21) Appl. No.: 13/184,621

(22) Filed: Jul. 18, 2011

Related U.S. Application Data

(60) Provisional application No. 61/503,741, filed on Jul. 1, 2011.

(51) Int. Cl.
*E04D 13/18* (2006.01)

(52) U.S. Cl.
USPC .......................................................... 52/173.3

(58) Field of Classification Search
USPC .......... 52/173.3; 126/621, 623; 136/244, 251; 405/262, 302, 284; 248/156
See application file for complete search history.

(56) References Cited

U.S. PATENT DOCUMENTS

| | | | | |
|---|---|---|---|---|
| 1,762,343 | A | * | 6/1930 | Munster ......................... 405/262 |
| 4,422,614 | A | | 12/1983 | Santos |
| 5,076,735 | A | * | 12/1991 | Hilfiker ......................... 405/284 |
| 5,125,608 | A | | 6/1992 | McMaster et al. |
| 5,149,188 | A | | 9/1992 | Robbins |
| 5,372,461 | A | * | 12/1994 | Nanayakkara ................ 405/262 |
| 6,024,516 | A | * | 2/2000 | Taylor et al. .................. 405/262 |
| 6,089,792 | A | | 7/2000 | Khamis |
| 6,299,386 | B1 | | 10/2001 | Byrne et al. |
| 6,421,966 | B1 | | 7/2002 | Braunstein et al. |
| 6,817,811 | B1 | * | 11/2004 | Chen ............................. 405/287 |
| 6,935,812 | B2 | * | 8/2005 | Rainey .......................... 405/262 |
| 7,168,892 | B1 | | 1/2007 | MacDonald et al. |
| 7,314,336 | B2 | | 1/2008 | Moss |
| 7,377,725 | B2 | | 5/2008 | Cammack |
| 7,536,832 | B2 | | 5/2009 | DeYoung |
| 7,600,948 | B2 | | 10/2009 | Cargill et al. |
| 7,708,502 | B2 | | 5/2010 | Carte et al. |
| 7,722,296 | B1 | | 5/2010 | Taylor |
| 7,798,748 | B2 | * | 9/2010 | La ................................. 405/285 |
| 8,246,274 | B1 | * | 8/2012 | Hall et al. ..................... 405/262 |
| 2003/0213203 | A1 | * | 11/2003 | Bott et al. ....................... 52/603 |
| 2004/0179901 | A1 | | 9/2004 | Kulchin |
| 2005/0265792 | A1 | * | 12/2005 | Lee ............................... 405/286 |
| 2005/0286980 | A1 | * | 12/2005 | Hilfiker ........................ 405/262 |
| 2009/0285640 | A1 | | 11/2009 | Hilfiker et al. |
| 2009/0308001 | A1 | * | 12/2009 | Wu et al. ....................... 52/173.3 |
| 2010/0071280 | A1 | * | 3/2010 | Brescia ......................... 52/173.3 |
| 2010/0129163 | A1 | * | 5/2010 | Suematsu et al. ............. 405/229 |
| 2010/0278592 | A1 | | 11/2010 | Walker |
| 2011/0135403 | A1 | | 6/2011 | Dudding et al. |
| 2012/0087742 | A1 | * | 4/2012 | Ogorchock .................... 405/262 |

* cited by examiner

*Primary Examiner* — Christine T Cajilig
(74) *Attorney, Agent, or Firm* — Hooker & Habib, P.C.

(57) ABSTRACT

A panel mounting system for mounting panels on a face of a berm includes horizontal support members extending into the berm and supported, in part, on facing along the face of the berm. The panel mounting system spaces the panels away from the face of the berm and is useful for mounting solar energy collecting panels to the berm while providing clearance for cabling between the berm and the panels. The panel mounting system can be installed when the berm is constructed.

35 Claims, 8 Drawing Sheets

PANEL MOUNTING SYSTEM FOR BERMS, SOLAR ENERGY FARM USING THE SYSTEM, AND METHOD OF INSTALLING THE SYSTEM

FIELD OF THE DISCLOSURE

The disclosure relates to mounting structures, and particular to mounting structures useful for mounting panels along a face of a berm, and to methods of installing such mounting structures.

BACKGROUND OF THE DISCLOSURE

Engineered earth berms are becoming more and more popular as retaining walls used to provide additional airspace for landfills and other facilities without additional lateral expansion of the facility.

Engineered earth berms have a steeply sloped to vertical face constructed of compacted fill material, which may be earth or soil. A mechanically stabilized earth berm includes vertically spaced, horizontal mechanical reinforcement members that resist deformation of the compacted fill material and enable construction of berms to increasingly greater heights.

The faces of engineered earth berms are often oriented such that relatively large amounts of solar energy impinge the face. It is desirable to develop a panel mounting system that mounts solar energy collector panels on the vertical face to collect solar energy. A panel mounting system should space the collector panels away from the face of the berm to enable the inclination angle of the collector panels to differ from the slope of the face. The space would also provide room for cabling, electrical converters, and other equipment used in conjunction with the collector panels, as well as access for repair. The panel mounting system should resist vertical loads generated by the collector panels and transverse loads generated by wind and the like. The panel mounting system must also be compatible with the construction of mechanically stabilized earth berms.

SUMMARY OF THE DISCLOSURE

The disclosure is a panel mounting system for mounting solar energy collector panels to a face of an engineered earth berm. The panel mounting system of the present disclosure spaces the collector panels away from the face of the berm and enables the collector panels to be inclined at an angle different from the slope of the face. The panel mounting system resists vertical loads generated by the weight of the collector panels and transverse loads generated by wind and the like. The panel mounting system is also compatible with the construction of mechanically stabilized earth berms, and can be installed during the construction of the berm itself.

A panel mounting system in accordance with the present disclosure may include a number of elongate support members having elongate support posts or pipes that each extend horizontally into the berm. Stabilizing members are attached to the portion of the post within the berm that resist displacement or rotation of the post caused by loads.

The panel mounting system can be used with mechanically stabilized earth berms. The support members can be located in the compacted soil layers between mechanical reinforcements.

In preferred embodiments of the disclosure, the berm facing is made of coarse aggregate. The post includes one stabilizing member that engages and presses against the aggregate. The one stabilizing member is closely spaced from the outer face of the berm and so minimizes the portion of the post 54 acting as a cantilever beam when supporting a vertical load. The location of the one stabilizing member may vary among support members to compensate for differences in how far the various posts extend from the face of the berm to position the collector panel or to compensate for the vertical or horizontal alignment of the berm.

The panel support system can be installed during the construction of the berm. Fill material can be compacted to form a first layer of compacted material and the support member is placed on the first layer of material. A second layer of fill material covers the support member and is compacted to form a second layer of compacted material. The compacted material makes intimate contact with the stabilizing members sandwiched between the layers and assures the support post is stabilized within the berm.

The panel support system of the present disclosure enables the vertical faces of engineered berms to collect solar energy that might otherwise be wasted and enables facilities to find second sources of income that are friendly to the environment and makes use of renewable resources.

Other objects and features of the disclosure will become apparent as the description proceeds, especially when taken in conjunction with the accompanying eight drawing sheets illustrating an embodiment of the disclosure.

DESCRIPTION OF THE PREFERRED EMBODIMENTS

Figure 1:
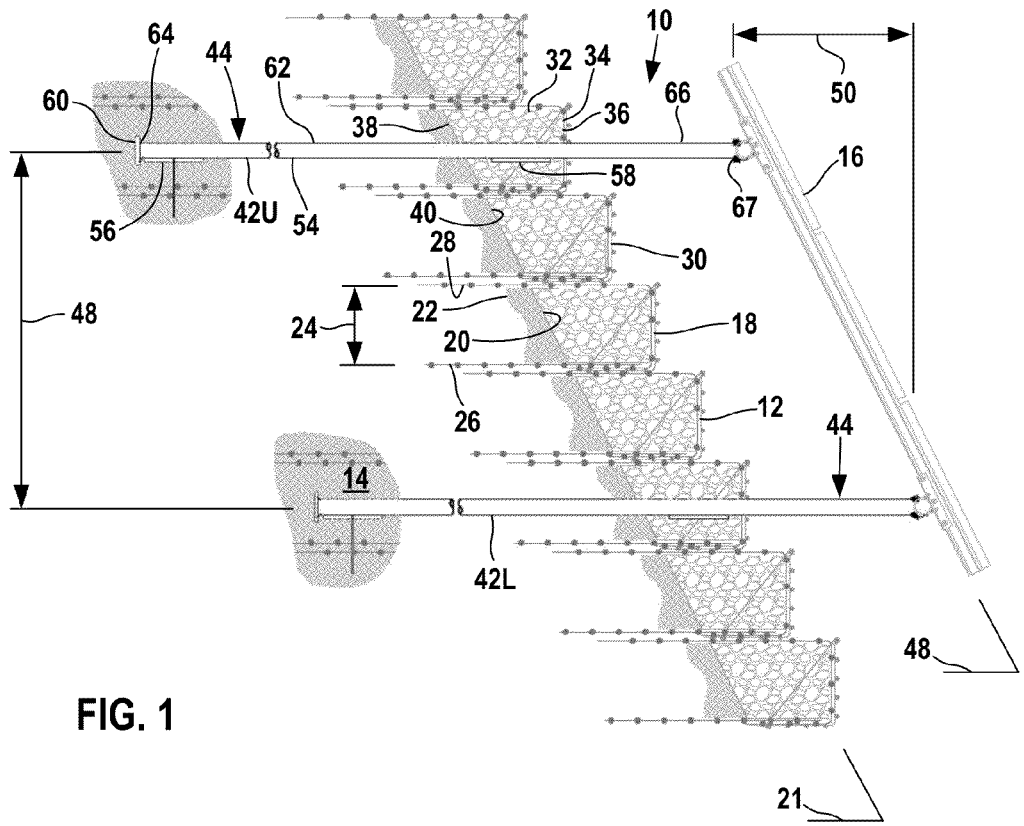
FIG. 1 is a side sectional view of the panel support system of the present disclosure installed on a berm to carry solar energy collector panels.
Figure 2:
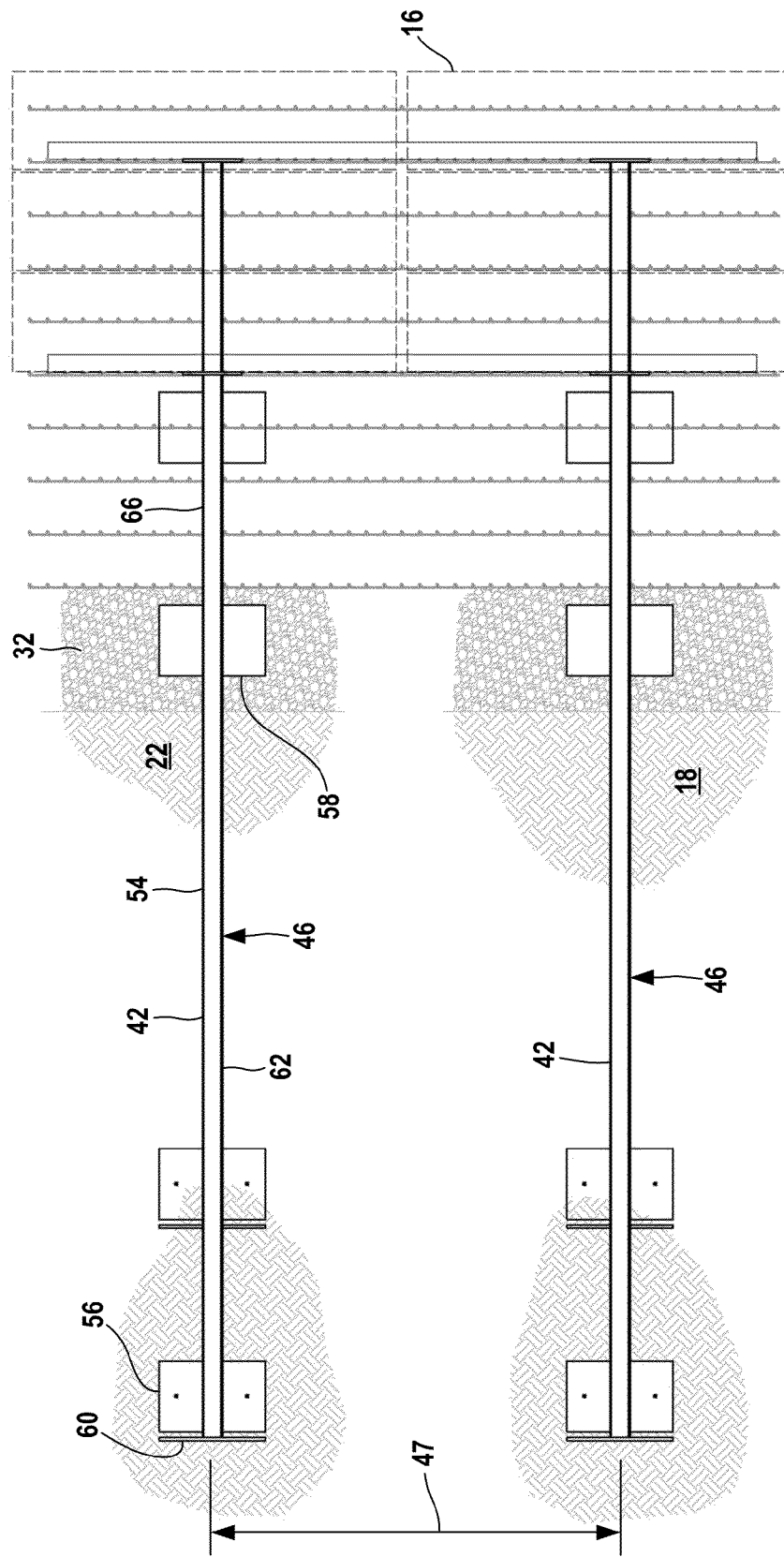
FIG. 2 is a top sectional view of the panel support system shown in FIG. 1.

FIGS. 1 and 2 illustrate a portion of a panel support system installed on a face 12 of an earthen berm 14 in accordance with the present disclosure. The support system 10 supports a conventional photovoltaic solar energy collector panel 16 and spaces the panel 16 from the berm face 12.

The berm 14 is a mechanically stabilized earthen berm made up of a number of like, vertically-stacked tiers 18 formed from compacted soil or earth. Each tier 18 has an earth face 20 that extends the height of the tier. The tiers 18 are stacked on one another such that the earth faces 20 define a continuous slope 21 extending upwardly from the base of the berm.

Each tier 18 is formed as a compacted soil layer 22 having a vertical dimension 24 and extending inwardly from the earth face 20. Planar mechanical reinforcement 26, 28 formed from a double layer of face-wrap geogrid extends horizontally along the respective upper and lower sides of the tier 18.

A wall facing 30 stabilizes each tier 18 and assists in securing the ends of the geogrids 26, 28. The illustrated wall facing 30 is formed from course rock aggregate 32 contained in sets of wire mesh baskets 34 that extend horizontally along the tier 18 and abut the earth face 20. Each basket 34 includes a vertical front side 36 forming part of the berm face 12. A layer of non-woven geotextile 40 separates the course aggregate facing and the earthen soil 38. Wall facing 30 need not be formed from aggregate 32 but may be formed from other materials including blocks or bodies of masonry, plastic, manufactured stone, concrete or wood.

The panel support system 10 includes a number of like, elongate horizontal support members 42 installed in the berm 14 that extend outwardly from the berm face 12. The support members 42 are arranged in sets of four, with each set supporting one collector panel 16.

FIGS. 1 and 2 illustrate one set of support members 42. The support members 42 are arranged in two vertically spaced rows 44 and two horizontally spaced columns 46. The rows 44 are in respective horizontal planes vertically spaced from one another, with the two support members 42 in each row parallel to one another and separated by a horizontal distance 47. The columns 46 are in respective vertical planes horizontally spaced from one another, with the two support members 42 in each column 46 parallel to one another and separated by a vertical distance 48.

As seen in FIG. 1, the vertical spacing 48 of the two rows of support members 42 is equal to an integer multiple of the tier height 24, namely four times the tier height in the illustrated embodiment. This enables each row 44 to be centered vertically between the mechanical reinforcements 26, 28 of the tier 18 containing the row.

As best seen in FIG. 1, the inclination angle 48 of the collector panel 16 is established by the relative horizontal offset 50 between the upper support members 42 and the lower support members 42. The illustrated inclination angle 48 is equal to the slope 21. Because the berm face 12 extends in the length dimension along a straight line, all four support members 42 extend outwardly the same distance from the berm face 12 and incline the collector panel 16 parallel with the slope 20.

Figure 3:
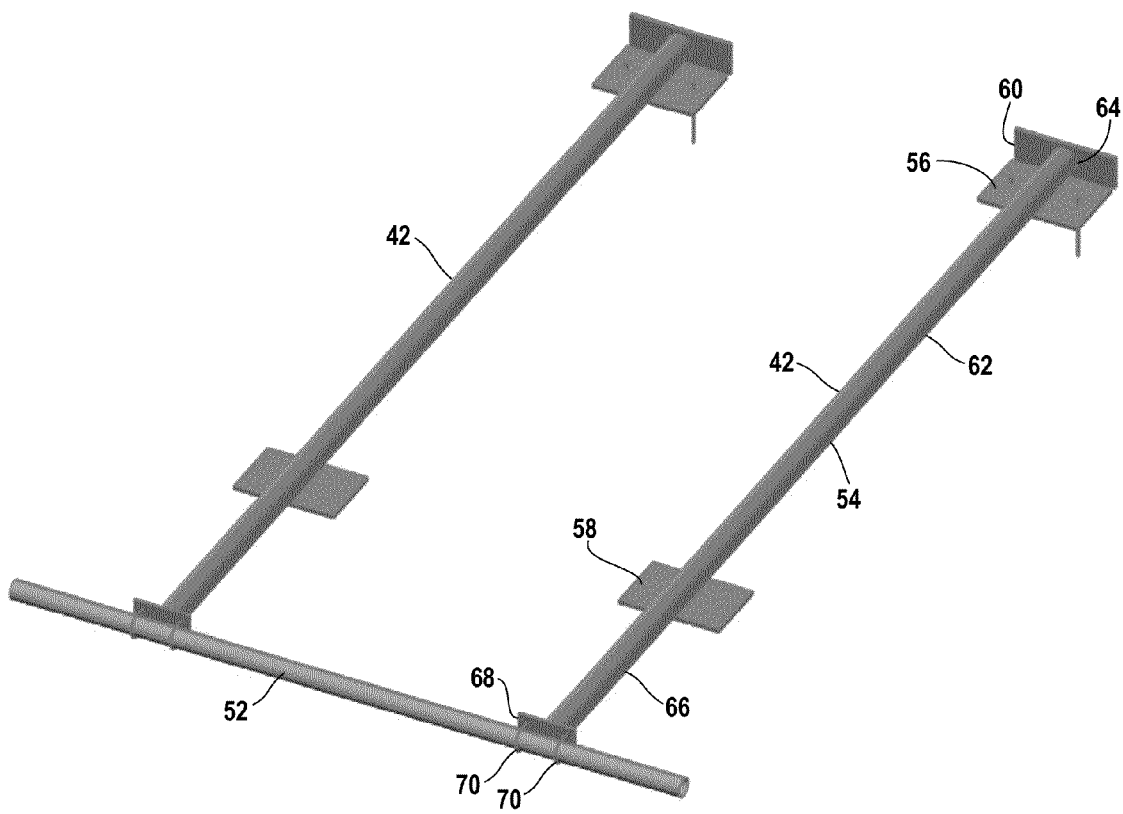
FIG. 3 is a perspective view of two support members of the panel support system carrying a support pipe used in mounting the collector panel to the support members without illustrating the surrounding berm or other earthen material.

FIG. 3 illustrates one of the rows of support members 42 shown in FIGS. 1 and 2. The support members 42 are shown carrying a support pipe 52 used in mounting the collector panel 16 to the support members.

In this embodiment, all the support members 42 are identical. Each support member 42 includes an elongate post 54 formed from four-inch diameter steel pipe, a back stabilizer plate 56, a forward stabilizer plate 58, and a rear stabilizer plate 60. The plates 56, 58, 60 are rigidly attached to the post 54 by welding or the like.

The post 54 is typically about fifteen feet long and includes a distal anchor portion 62 extending from a back end 64 and a proximal cantilever portion 66 extending to a front end 67 (see FIG. 1). The distal anchor portion 62 is intended to be installed in the berm 12 with the proximal portion 66 extending out of outer face 12 of the berm 14 as shown in FIGS. 1 and 2.

Each plate 56, 58, 60 is made of three-quarter inch thick steel plate. The back and front stabilizer plates 56, 58 are about eighteen inches wide and twelve inches long and are each attached to the same side of the post 54 to be co-planar with one another. The width dimension of each plate 56, 58 is centered along the pipe and extends perpendicular to the pipe axis. The back stabilizer plate 56 is located near or at the back post end 64. The forward stabilizer plate 58 is attached to the post anchor portion 62 and is spaced a short distance from the proximal portion 66 as will be discussed in greater detail later below. The plates 56, 58 are attached to the same side of the post 54 and are co-planar with one another.

The back plate 60 is attached to the post back end 64 and faces the post 54. The width dimension of the plate 60 is centered on the end of the pipe 54 and extends perpendicular to the pipe axis, extending along the back side of the back stabilizer plate 56.

The front end 64 of the post 54 is connected to mounting hardware configured for the specific load the support member will carry. In the illustrated embodiment, the mounting hardware includes a half-inch thick steel mounting plate 68 fixed to the end of the post that carries a pair of U-bolts 70 to receive and captures an end of the support pipe 52.

Referring back to FIGS. 1 and 2, the figures show the set of support members 42 installed in the berm 14 and supporting a solar collecting panel 16. The installed configuration of one the support members 42 will be described, it being understood the other support members 42 are installed in like manner.

The support member 42 is horizontal with the post 54 centered vertically between the mechanical reinforcements 26, 28 of the tier 18 containing the support member. The illustrated tier 18 has a vertical dimension of eighteen inches. The back support plate 56 is horizontal and is sandwiched between upper and lower compacted layers of earth. The back plate 60 is in a vertical orientation and faces the earth face 20. The post distal anchor portion 62 extends from the back end 64 through the compacted soil to and through the earth face 20 and through the rock aggregate 32. The front support plate 58 is located within the wire basket 34 and sandwiched between upper and lower layers of rock aggregate 32. The proximal portion 66 of the post 54 extends outwardly away from the basket 34 a sufficient distance to locate the collector panel 16 at least 3 feet from the berm face 12

The vertical load from the collector panel 16 transmitted to the support member 42 is carried by the post 54. The vertical load generates a moment attempting to rotate the post 54 clockwise as viewed in FIG. 1. A reaction force generated by the compacted soil resisting movement or rotation of the back support plate 56 resists this rotation. The vertical load is also shared by the front support plate 58 which transmits the load to the rock aggregate and urges the basket 36 against the earth face 20 and against the adjacent lower basket to help stabilize the berm. The front support plate 58 is spaced about three inches from where the post 54 emerges from the basket 36, thereby minimizing the portion of the post 54 acting as a cantilever beam when supporting a vertical load.

Transverse or horizontal loads generated by wind acting on the collector panel or the like are resisted by the reaction force generated by the compacted soil resisting movement or rotation of the back plate 60 and the compacted soil and rock aggregate resisting rotation of the support plates 56, 58.

Figure 4:
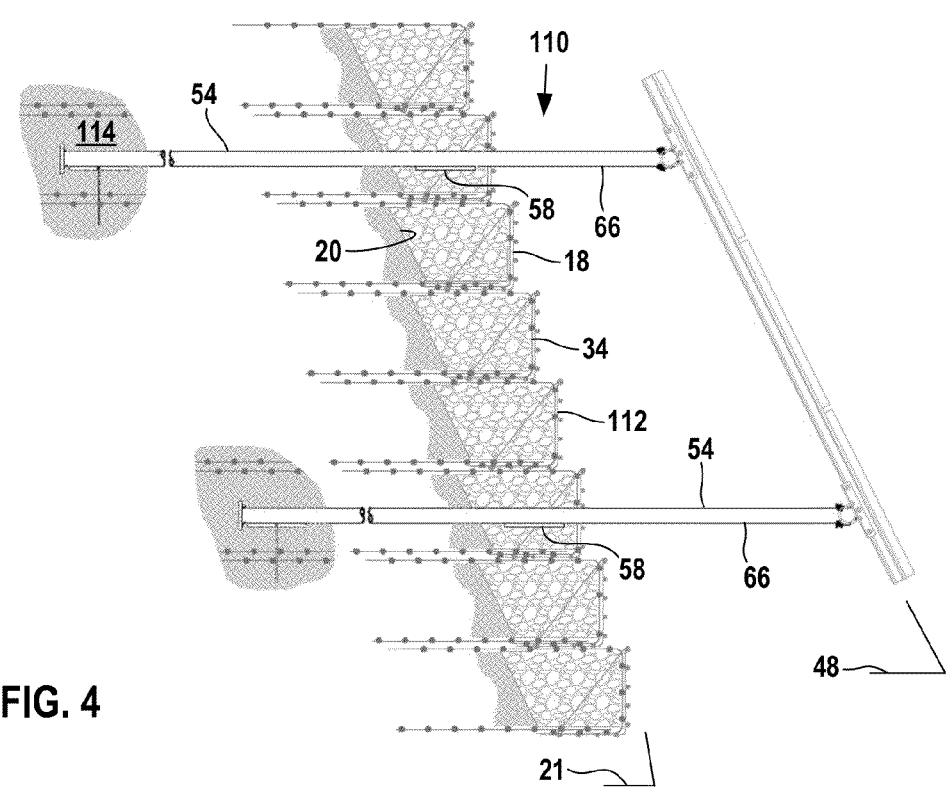
FIG. 4 is a side sectional view similar to FIG. 1 of the panel support system installed on a second berm with a different face slope inclination than FIG. 1.

FIG. 4 illustrates a second embodiment panel support system 110 installed on a face 112 of an earthen berm 114. Corresponding elements of the second embodiment support system 110 and second berm 114 are numbered with the same reference numerals as the first embodiment support system 10 and the berm 14.

The berm 114 is a mechanically stabilized earthen berm similar to the berm 14. In this embodiment, the berm tiers 18 are horizontally offset from one another such that the earth faces 20 form a discontinuous zig-zag slope up the berm. Part of a tier's soil layer overlaps an inside portion of the adjacent lower basket 34 so that the effective slope angle 21 is substantially greater than the slope angle of the earth face 20.

The collector inclination angle 48 of the collector panel 16 is identical to the inclination angle 48 shown in FIG. 1 but the inclination angle 48 is now less than the slope angle 21. The proximal portions 66 of the lower row of support posts must be longer than the proximal portions 66 of the upper row of support posts to position the collector panel at the correct inclination angle. It is still desired to locate the front support plates in the rock aggregate as previously described, so the front support plates 58 of the lower row of support posts are spaced further away from the forward ends of the posts than are the front support plates 58 of the upper row to compensate for the longer proximal post length.

Figure 5:
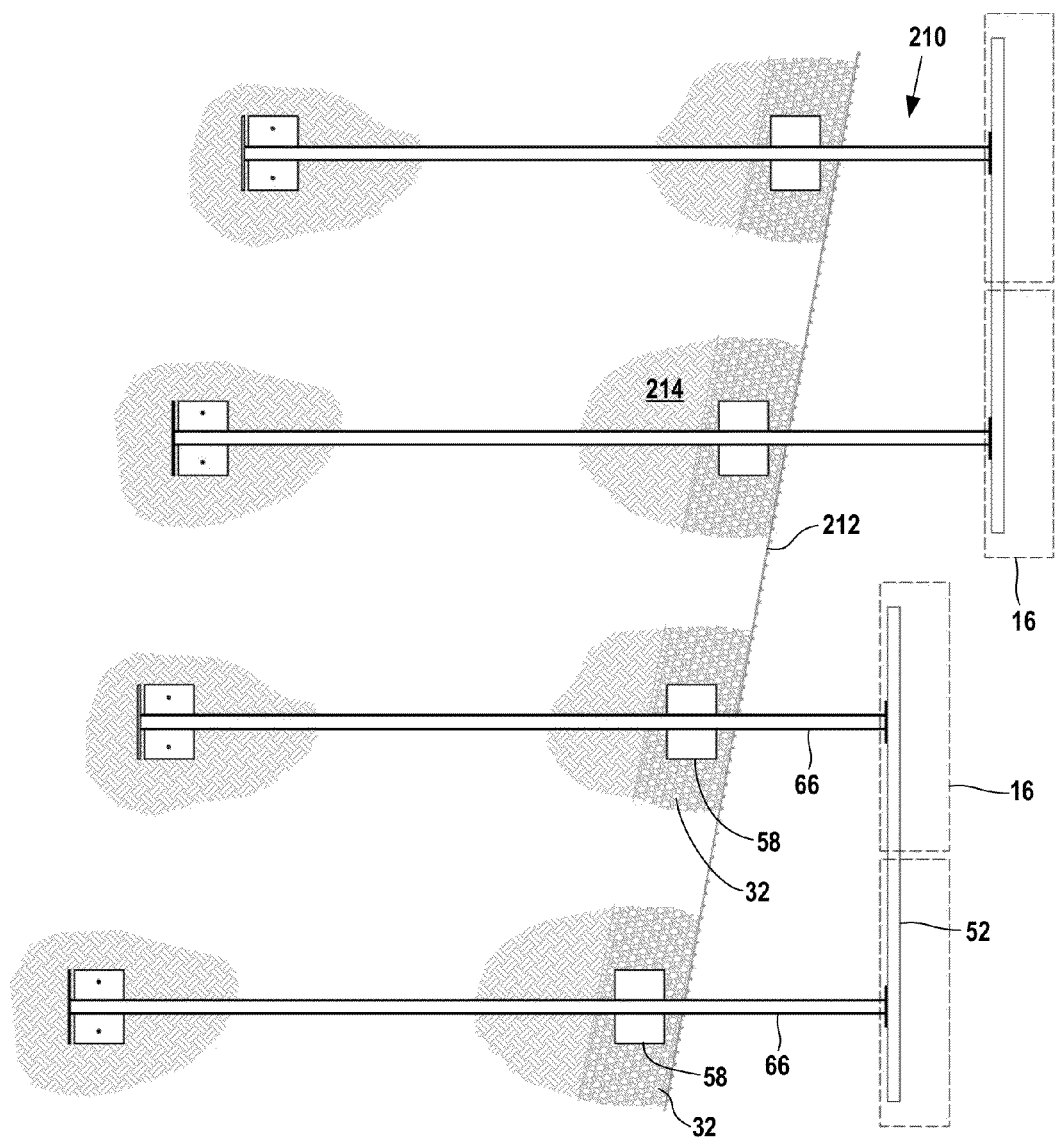
FIG. 5 is a top, partial sectional view of the panel support system installed on a third berm, which has a non-optimal angle for solar energy collection and thus, the support system illustrates differing cantilevered lengths.

FIG. 5 illustrates a third embodiment panel support system 210 installed on a vertical face 212 of an earthen berm 214. Corresponding elements of the third embodiment support system 210 and the third berm 214 are numbered with the same reference numerals as previously used.

The berm 214 is similar to the berm 14 but its horizontal alignment is not parallel to the plane of the collector panels 16. The proximal portions 66 of one column of posts are longer than the proximal portions 66 of the other column of posts to compensate for the horizontal alignment of the berm. The locations of the front support plates 58 of the support members 42 are adjusted accordingly to support the front support plates 58 against the rock aggregate 32 as previously described.

In yet other embodiments, the berm may extend along a curved horizontal path that curves towards or away from the collector panels, and the lengths of the proximal portions of the post members and the locations of the front support plates would be adjusted as necessary to compensate for the curvature.

The panel support system is preferably installed as part of the construction of the berm. The berm can then be designed to maximize solar collection by optimizing the orientation and slope of the berm face for receiving solar energy, minimizing shading, and maximizing the area available for collector panels. The berm can be designed with tiers whose vertical heights are compatible with the desired vertical spacing of support members. Support members can be manufactured in advance of installation to conform with the horizontal and vertical alignment of the berm.

FIGS. 6-10 illustrate installing the portion of the panel support system 110 as part of the construction of the berm 114 shown in FIG. 4.

The original ground is prepared in a conventional manner to be the foundation or base of the berm. The vertical tiers 18 are then constructed in a conventional manner beginning on the base, with each additional tier utilizing the adjacent lower tier as a base.

Figure 6:
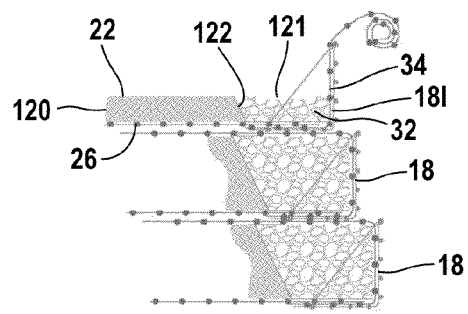
FIGS. 6-10 are side views similar to FIG. 4 but illustrating installing the panel support system concurrently with construction of the berm shown in FIG. 4.
Figure 7:
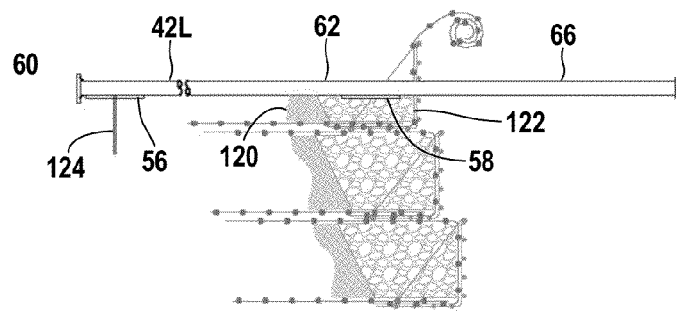
Figure 8:
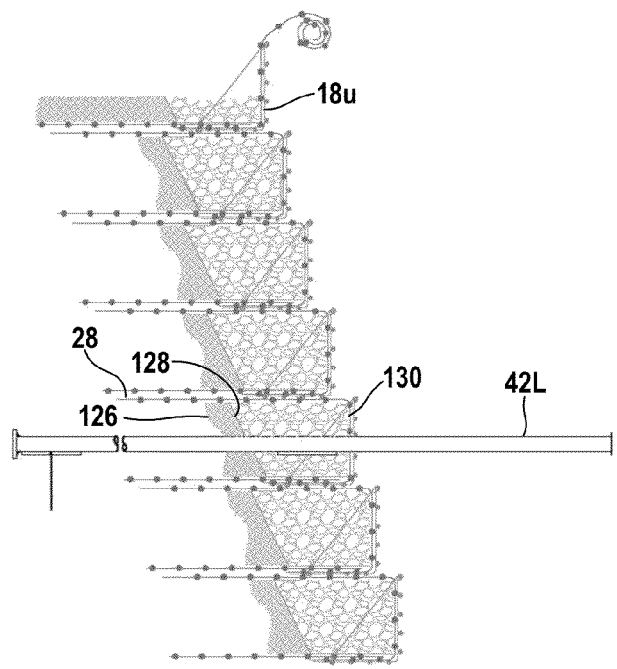

FIG. 6 illustrates a tier 18l under construction that will receive a lower row of support members 42l extending along the length of the tier as shown in FIG. 7. A lower mechanical reinforcement member 26 is placed on the base and a layer of earth or other appropriate fill material 22 covers the reinforcement member 28. The fill material is compacted in a vertical dimension to form a compacted first material layer 120 having a first earth face 122. A first layer of rock aggregate 32 is placed in a wire basket 34 against the earth face 122. The first layer of rock aggregate 122 is even or flush with the compacted first layer 120.

A support member 42L is placed on the compacted first layer 120. The vertical height of the first layer of materials 120, 122 is such that the post member 52 will be vertically centered in the completed tier 18l. The distal portion 62 of the post 52 is supported against the first layer of material 120 and the first layer of rock aggregate 122, and the proximate portion 66 of the post 52 extends out of the basket 34 as shown in FIG. 7. The lower surface of the back support plate 56 is against the upper surface of the layer 120 and the lower surface of the front support plate 58 is against the first layer of rock aggregate as shown in the figure.

The back support plate 56 preferably includes through-holes that enable spikes 124 to be driven through the plate 56 and into the first layer of material 120 and into the next lower tier. The spikes 124 help resist movement of the support member 42 during installation and can remain permanently in place.

A second layer of soil or fill material is deposited on the first layer of material 120 and compacted against the first layer, the upper face of the back support plate 56, and the post to form a second layer of compacted material 126 having a front face 128. See FIG. 8. The back support plate 56 becomes sandwiched between the two layers of compacted material and comes into intimate contact with the material. A second layer of rock aggregate 130 fills the basket and covers the front support plate 58 and the post 52. An upper layer of mechanical reinforcement 28 is placed over the basket and the compacted fill layer.

Figure 9:
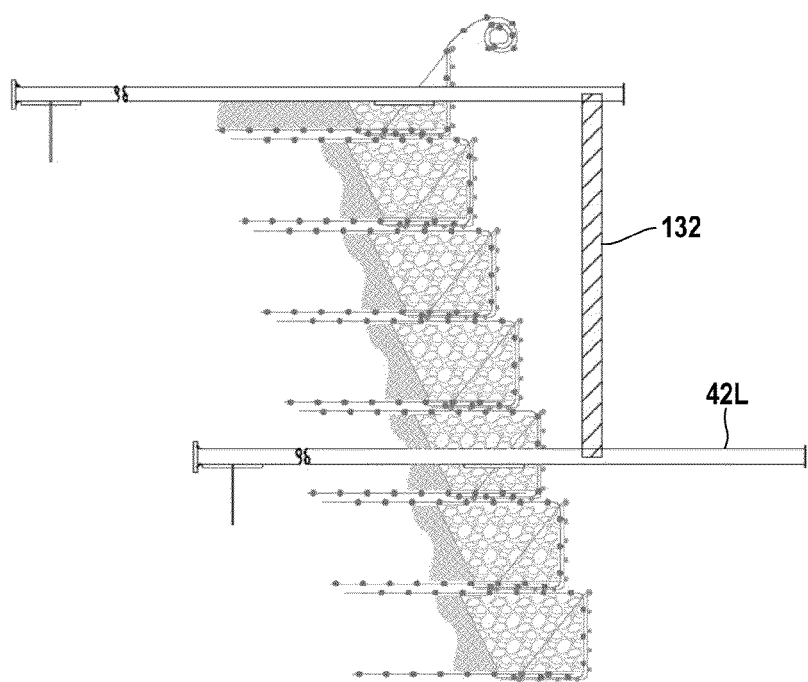

Additional tiers 18 are then constructed in a conventional manner until the tier 18u is reached that will receive the upper set of support members 42. This tier 18u is prepared to receive the upper row of support members 42 as previously described for the lower tier 18l. FIG. 9 illustrates a support member 42 placed on the first layer of fill material and rock aggregate and spiked to retain its position during construction. A template 132 can be used to assure proper horizontal and vertical spacing of a set of support members 42 during installation.

Figure 10:
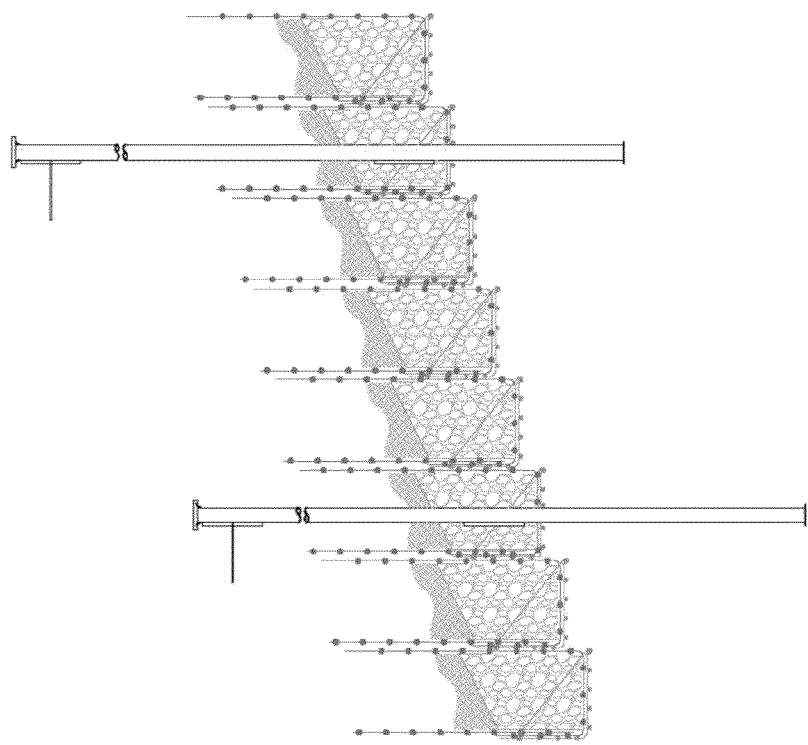

Additional tiers 18 are then constructed and additional support members installed in those tiers as needed until the berm is completed, see FIG. 10.

Figure 11:
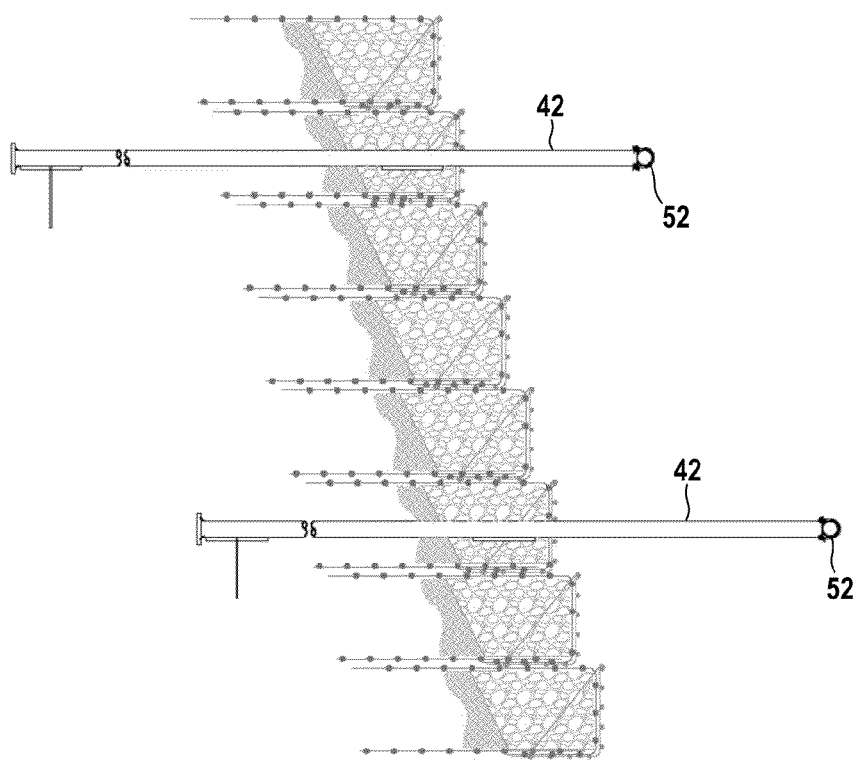
FIGS. 11 an 12 are views similar to that of FIG. 4 illustrating attaching a collector panel to support members of the panel support system.
Figure 12:
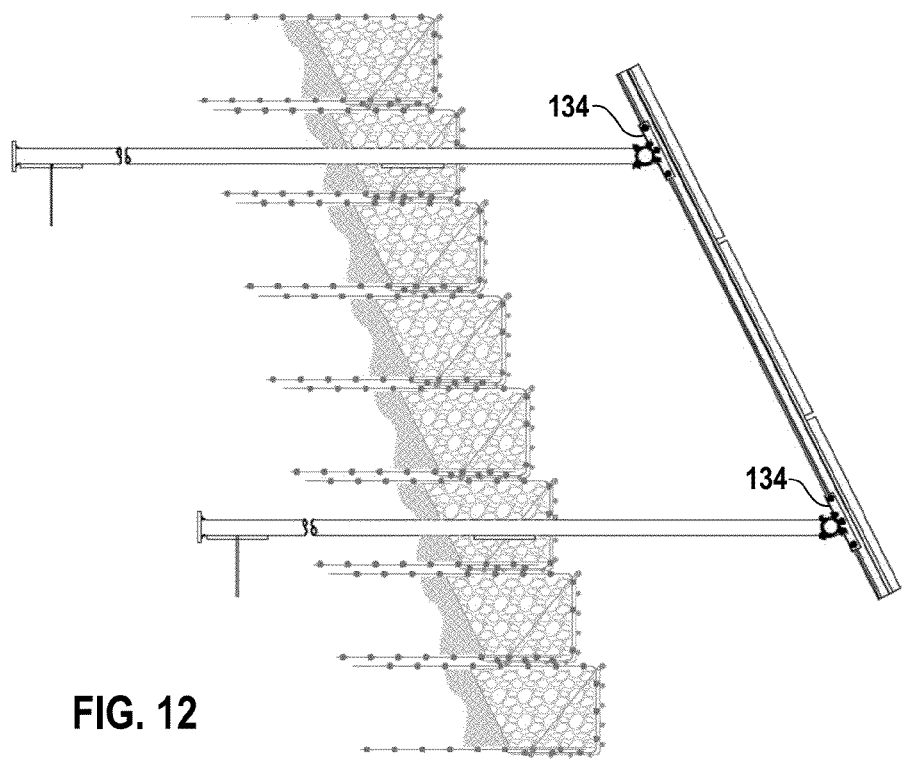

FIGS. 11 and 12 illustrate mounting a collector panel to a set of support members 42. Support pipes 52 are mounted to the upper and lower rows of support members 42 as previously described. A pair of mounting brackets 134 are attached to each support pipe 52 by U-bolts and are spaced apart to engage corresponding mounting structure on the panel 16 for holding the panel 16 by the upper and lower support pipes 52.

Figure 13:
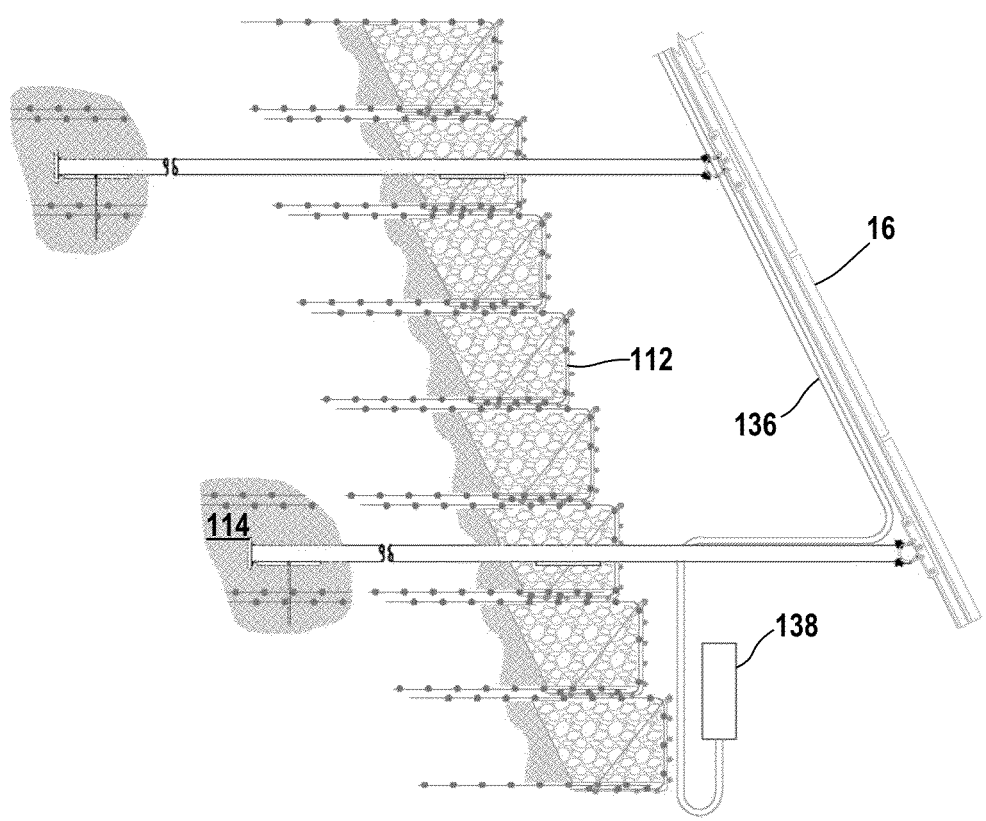
FIG. 13 is a side view similar to that of FIG. 4 illustrating the collector panel forming part of a solar panel farm.

FIG. 13 illustrates the collector panel 16 installed in FIG. 12 as part of a solar energy farm in which a array of solar panels arranged along a line or in a polygonal formation of collector panels 16 extend along the berm 114. Interpanel cabling 136 extends from the collector panel 16 and extends to a DC/AC inverter 138. The space between the collector panel 16 and the berm face 112 provides installation and repair crews access to the underside of the collector panel 16 for installation and repair of cabling 136, inverters 138, and other system components needed for the solar energy farm. The work space also facilitates removal of a collector panel and replacement with a later-developed, more efficient collector panel that may be thicker or require different cabling.

In the illustrated embodiments, the collector panels 16 are mounted with a fixed inclination angle. In other embodiments, the collector panels could be mounted for limited rotation about an axis in reaction to changes in sun elevation. The support members of the present disclosure can provide sufficient clearance from the berm for such rotation.

Because the collector panels 16 shade the face of the berm, an aggregate rock facing as used in the illustrated embodiments is a preferred wall facing to reduce or eliminate vegetation from interfering with operation of the panels 16 and related hardware.

If the panel support system is used to support other types of panels or structures (as non-limiting examples, advertising signs or art works), different facing designs may be used. For example, in some facing designs, a decorative panel is mounted on the outside of the wire baskets and forms the outer facing of the berm. In such embodiments, the support members 42 could extend through holes in the decorative panels. In other embodiments solid panels rest directly against the earth facings. The support members 42 would extend through holes in the solid panels or the panels could be formed as two-part members with an upper member installed against a lower member after the support member is placed to extend over the lower member during construction of the berm.

The illustrated mechanical reinforcement or soil reinforcement is a flexible reinforcement, namely geogrid or geotextile. Engineering judgment may result in the use of other soil reinforcement materials, including rigid soil reinforcements made of metal or other types of flexible mechanical soil reinforcement as is known in the engineered berm and retaining wall art.

The illustrated embodiments illustrate the panel mounting system used to mount panels on a vertical face of an engineered berm. The panel mounting system could also be used to mount panels on a face of a hillside or other natural formation, and the term "berm" as used herein is meant to include both natural and engineered structures having a face slope ranging from approximately 20° to 90° (vertical).

While we have illustrated and described a preferred embodiment, it is understood that this is capable of modification, and we therefore do not wish to be limited to the precise details set forth, but desire to avail ourselves of such changes and alterations as fall within the purview of the following claims.

What we claim as our invention is:

1. A panel array for mounting one or more panels on the outer face of a berm and supporting the one or more panels away from the berm, the panel array comprising a berm with a sloped or vertical outer face extending along one side of the berm; one or more panels overlying the outer face of the berm, facing away from the outer face of the berm and spaced away from the outer face of the berm; and a plurality of elongate panel support members, each panel support member comprising a first end away from the outer face of the berm, a cantilever portion extending from the outer face of the berm to the first end of the support member, and an anchor portion joining the cantilever portion at the outer face of the berm and extending into the berm, the first end of each support member attached to a panel; and an open space between each panel and the outer face of the berm; the cantilever portions of one or more support members having equal or non-equal lengths; wherein each panel is mounted away from the outer face of the berm in a desired orientation.

2. The panel array as in claim 1 wherein the outer face of the berm is stepped.

3. The panel array as in claim 1 wherein the support members extend into the berm at steps in the outer face of the berm.

4. The panel array as in claim 1 wherein one panel generally parallels the outer face of the berm and the support member cantilever portions for such panel are substantially the same length.

5. The panel array as in claim 1 wherein one panel does not generally parallel the outer face of the berm and two support member cantilever portions for such one panel are not the same length.

6. The panel assembly as in claim 5 wherein four support member cantilever portions support such one panel and such cantilever portions include two pairs of different length portions.

7. The panel assembly as in claim 1 wherein four support members support each panel on the berm and the four support members for each panel include two pairs of different length cantilever portions.

8. The panel array of claim 1 wherein the berm comprises an earth face and a facing against the earth face, each anchor portion at least partially supported by the facing.

9. The panel array of claim 8 wherein the facing comprises an aggregate or members made from masonry, plastic, manufactured stone, concrete, or wood.

10. The panel array of claim 1 wherein each support member extends along an essentially horizontal axis.

11. The panel array of claim 10 wherein each support member comprises an elongate post and a first support plate attached to the anchor portion of the post and extending away from the post.

12. The panel array as in claim 11 wherein each support member comprise a cylindrical post.

13. The panel array of claim 11 wherein the berm comprises compacted material and a facing against the compacted material, and each support member comprises a second support plate, the first support plate in the compacted material and the second support plate in the facing.

14. The panel array of claim 13 wherein the facing comprises rock aggregate, each second support plate in the rock aggregate.

15. The panel array of claim 13 wherein the support members comprise a first set of support members, wherein the first and second support plates are spaced a first distance apart, and a second set of support members, wherein the first and second horizontal support plates are spaced a second distance apart, the first distance greater than the second distance.

16. The panel array of claim 15 wherein the first and second sets of support members are vertically spaced from one another.

17. The panel array of claim 15 wherein the first and second sets of support members are horizontally spaced from one another.

18. The panel array of claim 11 wherein each post extends along an axis and at least one support plate comprises a plate perpendicular to the axis.

19. The panel array of claim 1 wherein two support members are attached to each panel, and the cantilever portions of the two support members attached to each panel have different lengths.

20. The panel array of claim 1 wherein the berm comprises a plurality of vertically stacked tiers separated by vertically spaced soil reinforcement members, each support member between a pair of adjacent soil reinforcement members.

21. The panel array of claim 1 wherein each of the one or more panels is a solar energy collecting panel.

22. The panel array of claim 21 comprising cabling connected to the one or more panels and extending between the one or more panels and the berm in the open space.

23. The panel array of claim 21 wherein each of the one or more panels is a photovoltaic panel.

24. The panel array of claim 21 wherein the one or more solar collecting panels includes two or more solar collecting panels, and cabling interconnecting the two or more solar collecting panels.

25. The panel array of claim 1 wherein said open spaces comprise a work space between the outer face of the berm and each of the one or more solar collecting panels.

26. A method of erecting a panel on a berm, the berm having a steeply sloped or vertical outer face, the method comprising the steps of:
   (a) placing a generally horizontal, elongate post partially into the face of the berm, the post having an anchoring portion in the berm and a cantilever portion extending out of and away from the outer face of the berm; and
   (b) attaching a panel to the cantilever portion of the post to position the panel a distance away from the outer face of the berm and establish a space between the outer face of the berm and the panel.

27. The method of claim 26 comprising the step of:
   (c) performing step (a) before performing step (b).

28. The method of claim 26 wherein step (a) comprises the steps of:
   (c) depositing a first layer of material onto a base, the first layer having a vertical dimension;
   (d) compacting the first layer of material in the vertical dimension against the base, the compacted first layer having an upper surface and a face extending in the vertical dimension;
   (e) placing a facing against the face of the compacted first layer of material, the facing having an upper surface essentially flush with the upper surface of the first layer of compacted material;
   (f) providing a support member comprising said post and a first support plate attached to the post, the first support plate extending from the anchoring portion of the post and comprising a lower side and an opposite upper side;
   (g) placing the support member on the upper surface of the compacted first layer, at least a portion of the anchoring portion of the post over the upper surface of the first layer of material and the lower side of the first support plate against the upper surface of the facing, the cantilever portion of the post extending outwardly away from the upper surface of the facing to an outer end spaced from the outer face;
   (h) depositing a second layer of material on the compacted first layer of material, the second layer of material having a vertical dimension and a face extending in the vertical dimension; and
   (i) compacting the second layer of material in the vertical direction.

29. The method of claim 28 comprising:
   (j) placing the second layer of material over the upper side of the first support plate whereby the first support plate is sandwiched between the first and second layers of material.

30. The method of claim 28 wherein the support member comprises a second support plate attached to the anchoring portion of the post and including a horizontal surface extending from the anchoring portion of the post, and comprising the step of:
   (j) placing the second layer of material over the horizontal surface of the second support plate.

31. The method of claim 28 comprising the step of:
   (j) placing a mechanical reinforcement against the base prior to performing step (c).

32. The method of claim 28 comprising the step of:
   (j) placing a mechanical reinforcement on the second layer of material.

33. The method of claim 28 wherein step (b) comprises the step of:
   (j) attaching a solar energy panel to the cantilever portion of the post.

34. The method of claim 33 wherein the post represents a first post, the method comprising the step of:
   (j) attaching the solar energy panel to a plurality of second posts inserted into the berm, the first post and the plurality of second posts spaced apart horizontally and vertically from one another.

35. The method of claim 28 wherein step (b) comprises the step of:
   (j) attaching an advertising panel to the cantilever portion of the post.

* * * * *